(12) United States Patent
Asano (10) Patent No.: US 10,506,114 B2
(45) Date of Patent: Dec. 10, 2019

(54) IMAGE FORMING APPARATUS AND CONTROL METHOD OF IMAGE FORMING APPARATUS

(71) Applicant: CANON KABUSHIKI KAISHA, Tokyo (JP)

(72) Inventor: Kohei Asano, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/707,832

(22) Filed: Sep. 18, 2017

(65) Prior Publication Data
US 2018/0091662 A1  Mar. 29, 2018

(30) Foreign Application Priority Data
Sep. 23, 2016  (JP) ................ 2016-185905

(51) Int. Cl.
| | |
|---|---|
| *G06F 3/12* | (2006.01) |
| *H04N 1/00* | (2006.01) |
| *G05F 1/00* | (2006.01) |
| *G06F 1/30* | (2006.01) |
| *H02J 7/00* | (2006.01) |
| *H02J 1/00* | (2006.01) |

(52) U.S. Cl.
CPC ......... *H04N 1/00384* (2013.01); *G05F 1/00* (2013.01); *G06F 1/30* (2013.01); *H02J 1/00* (2013.01); *H02J 2007/0095* (2013.01)

(58) Field of Classification Search
None
See application file for complete search history.

(56) References Cited

U.S. PATENT DOCUMENTS

| | | | | |
|---|---|---|---|---|
| 8,760,130 B2 * | 6/2014 | Yamaguchi | ............ | H03K 17/60 323/265 |
| 9,060,087 B2 * | 6/2015 | Hashimoto | ........ | H04N 1/00888 |
| 9,270,163 B2 * | 2/2016 | Shimura | ................ | G03G 15/80 |
| 9,740,153 B2 * | 8/2017 | Sakamaki | ................. | G06F 1/30 |
| 2005/0108559 A1 * | 5/2005 | Suzuki | ............. | G06K 19/06009 713/193 |

(Continued)

FOREIGN PATENT DOCUMENTS

| | | |
|---|---|---|
| CN | 103312918 A | 9/2013 |
| CN | 105786161 A | 7/2016 |

(Continued)

*Primary Examiner* — Dung D Tran
(74) *Attorney, Agent, or Firm* — Canon U.S.A., Inc. IP Division (57) ABSTRACT

An image forming apparatus includes a non-volatile storage unit, a power circuit, a power switch for the power circuit, a determination unit, and a power control unit. The determination unit is configured to determine an address through a predetermined method before power is turned off or voltage decreases after activation. The power control unit is configured to execute power-off processing in a case where an operation instruction of the power switch is provided after power-on processing and execute writing of information to be saved with respect to an address of the non-volatile storage unit previously determined by the determination unit in a case where a decrease in voltage of the power circuit is detected after the power-on processing.

21 Claims, 7 Drawing Sheets

(56) References Cited

U.S. PATENT DOCUMENTS

| | | | | |
|---|---|---|---|---|
| 2013/0242341 | A1* | 9/2013 | Kasahara | G06K 15/02 358/1.15 |
| 2013/0278958 | A1* | 10/2013 | Kuwahara | H04N 1/00204 358/1.13 |
| 2014/0340703 | A1* | 11/2014 | Hashimoto | H04N 1/00888 358/1.14 |

FOREIGN PATENT DOCUMENTS

| | | |
|---|---|---|
| JP | 8-017192 A | 1/1996 |
| JP | 2002-103738 A | 4/2002 |
| JP | 2007-243547 A | 9/2007 |

* cited by examiner

IMAGE FORMING APPARATUS AND CONTROL METHOD OF IMAGE FORMING APPARATUS

BACKGROUND OF THE INVENTION

Field of the Invention

One disclosed aspect of the embodiments relates to an image forming apparatus and a control method of the image forming apparatus.

Description of the Related Art

There is provided an apparatus such as an image forming apparatus constantly energized and operating continuously. Because the above apparatus includes a fax function, the apparatus has to automatically reactivate and return to a fax stand-by mode at the time of power recovery even if a power failure has occurred. Further, there is provided an apparatus such as a personal computer which uses a push switch as a power on/off switch. The above apparatus detects a press of the switch to start activation processing or termination processing of the apparatus. In a case where the push switch is used for the apparatus constantly energized and operating continuously, even if the power is recovered after occurrence of an alternating-current (AC) power loss caused by the power failure, the apparatus cannot reactivate and operate at the time of the power recovery because a press event of the switch will not occur.

In a technique discussed in Japanese Patent Application Laid-Open No. 2007-243547, a flag that identifies whether an apparatus has been terminated normally is set, so that an AC power loss is identified by checking the flag every time the power is recovered, and a power failure information flag is written using a remaining electric charge at the time of the power failure. Further, when the power has recovered from the AC power loss, the apparatus reactivates without waiting for a press event of the switch. This flag is written into a non-volatile memory because it is necessary to retain the flag even if the power failure has occurred. However, a general-purpose non-volatile memory has a limitation in the maximum number of writing times.

According to a method discussed in Japanese Patent Application Laid-Open No. 8-017192, in order to extend a writing lifetime of a non-volatile memory, writing is executed while shifting a writing position by one bit every time, and information is deleted when the non-volatile memory has become full.

SUMMARY OF THE INVENTION

According to an aspect of the embodiments, an image forming apparatus includes a non-volatile storage unit, a power circuit, a power switch for the power circuit, a determination unit, and a power control unit. The determination unit is configured to determine an address of the non-volatile storage unit through a predetermined method before power is turned off or voltage decreases after activation. The power control unit is configured to execute power-off processing in a case where an operation instruction of the power switch is provided after power-on processing and execute writing of information to be saved with respect to an address of the non-volatile storage unit previously determined by the determination unit in a case where a decrease in voltage of the power circuit is detected after the power-on processing.

Further features of the disclosure will become apparent from the following description of exemplary embodiments with reference to the attached drawings.

DESCRIPTION OF THE EMBODIMENTS

Figure 1:
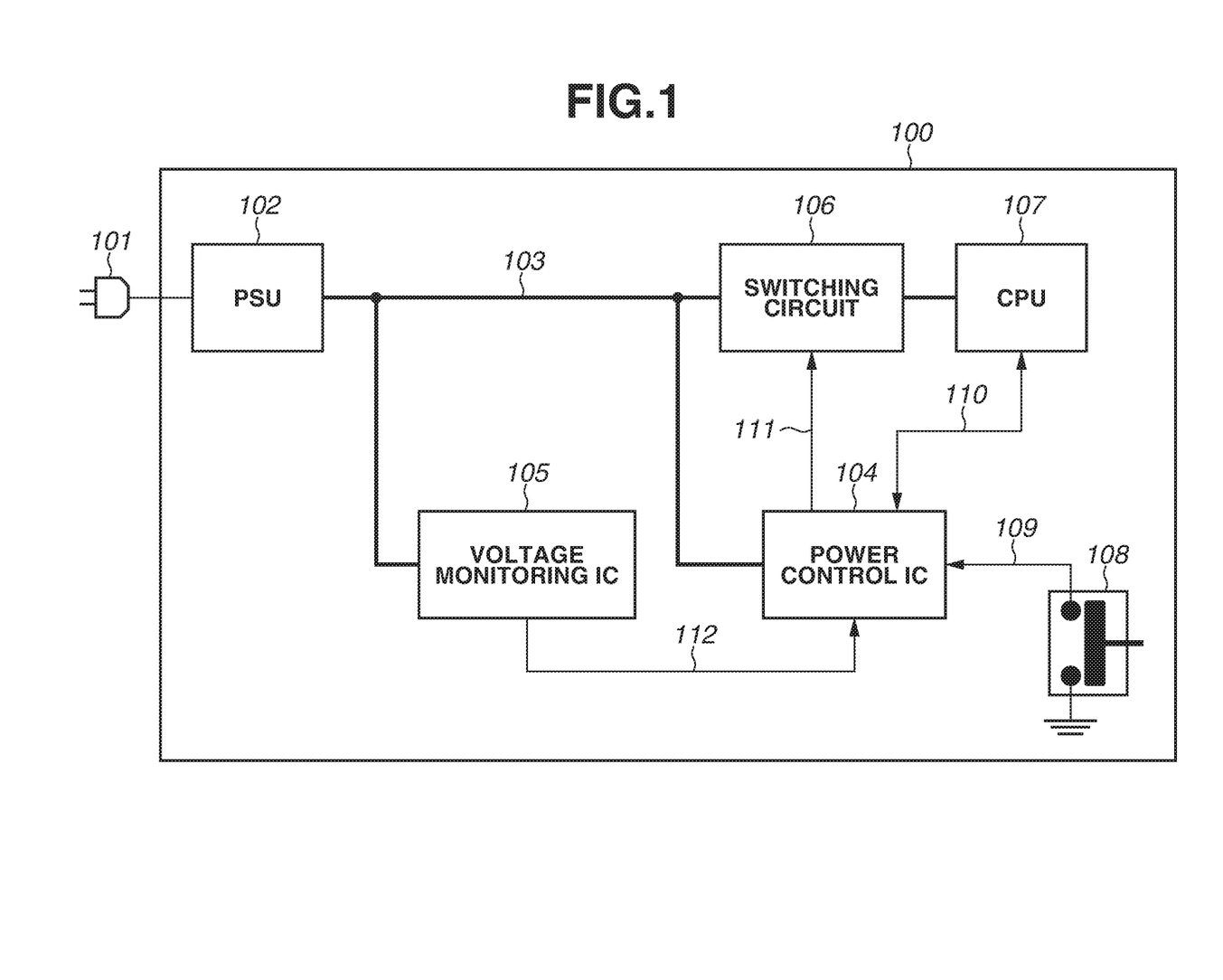
FIG. 1 is a block diagram illustrating a configuration example of an information processing apparatus.

FIG. 1 is a block diagram illustrating a configuration example of an information processing apparatus 100 according to a first exemplary embodiment. For example, the information processing apparatus 100 is an image forming apparatus which includes an alternating-current (AC) plug 101, a power supply unit (PSU) 102, a central processing unit (CPU) 107, a switching circuit 106, a voltage monitoring integrated circuit (IC) 105, a power control IC 104, and a power switch 108. The power switch 108 is a push-switch type power on/off button. The AC plug 101 is connected to an external commercial AC power to transmit received AC power to the PSU 102. The AC plug 101 can be inserted or removed by a user at an optional timing. The PSU 102 is a power supply unit or a power supply circuit which is connected to the AC plug 101 and receives AC power to generate direct-current power. The PSU 102 supplies direct-current power to respective devices in the information processing apparatus 100 via a power supply line 103. The CPU 107 is a central processing unit which controls the entirety of the information processing apparatus 100 by receiving direct-current power from the PSU 102. The switching circuit 106 is connected between the PSU 102 and the CPU 107, and switched to supply direct-current power (power voltage) to the CPU 107. When the switching circuit 106 is in a closing state, direct-current power is supplied to the CPU 107 from the PSU 102. When the switching circuit 106 is in an opening state, the direct-current power is not supplied to the CPU 107 from the PSU 102. When the direct-current power supply with respect to the CPU 107 stops, the information processing apparatus 100 is forcibly brought into a shutdown state. The power control IC 104 is operated by the direct-current power supplied from the PSU 102, so as to execute power control of the entirety of the information processing apparatus 100. The voltage monitoring IC 105 is a voltage detection unit, which is connected to the power supply line 103 and detects whether the direct-current power voltage output from the PSU 102 is dropped (e.g., decreases) to a value less than a threshold value. In a case where the direct-current power voltage is dropped to a value less than the threshold value, to the voltage monitoring IC 105 outputs a voltage drop notification signal 112 to the power control IC 104. The power switch 108 is a physical switch connected to the power control IC 104, which can be pressed by a user at an optional timing. When the user presses the power switch 108, the power switch 108 outputs a pressed-switch signal 109 to the power control IC 104. The power control IC 104 outputs a control signal 111 to the switching circuit 106, and outputs and receives a signal 110 to/from the CPU 107.

Figure 2:
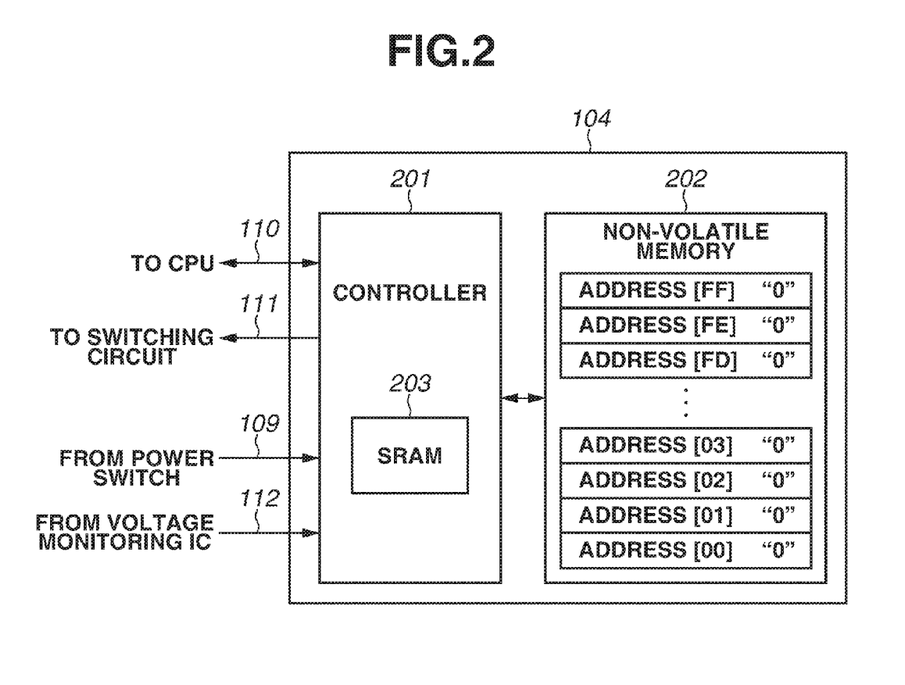
FIG. 2 is a block diagram illustrating a configuration example of a power control integrated circuit (IC).

FIG. 2 is a diagram illustrating a configuration example of the power control IC 104. The power control IC 104 includes a controller 201 and a non-volatile memory 202. The controller 201 includes a static random access memory (SRAM) 203. The controller 201 is a power control unit having a power control function of the power control IC 104, a communication function, and a function of accessing the non-volatile memory 202. The non-volatile memory 202 is a non-volatile storage unit which is connected the controller 201 and stores information to be saved under the control of the controller 201. The non-volatile memory 202 includes a memory region having addresses of [00] to [FF], and writing is executed in an address unit. The SRAM 203 is a volatile memory for storing a value that can be used by the controller 201.

Figure 3:
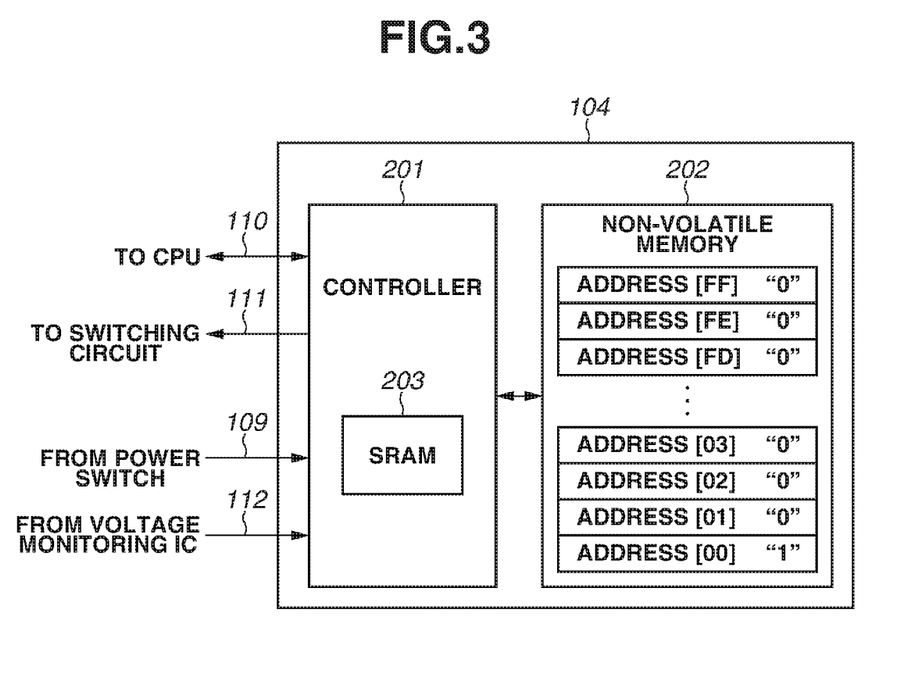
FIG. 3 is a block diagram illustrating an inner portion of the power control IC terminated normally last time.
Figure 4:
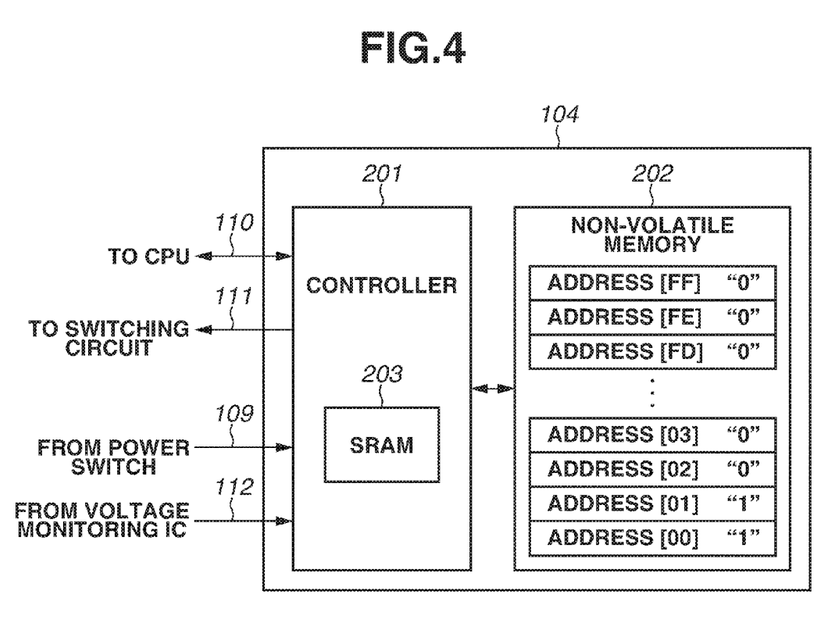
FIG. 4 is a block diagram illustrating an inner portion of the power control IC terminated abnormally last time.

FIGS. 3 and 4 are diagrams illustrating the power control IC 104 in which writing is executed on the non-volatile memory 202. Herein, for the sake of simplicity, an exemplary embodiment in which data of one-bit is stored in one address will be described although the non-volatile memory 202 can store data of more than one-bit in one address. A value "0" is an initial value of each of the addresses of the non-volatile memory 202. In FIG. 3, only an address[00] is in use, so that a value "1" is written into the address[00]. The rest of the addresses are not in use, and have an initial value "0". On the other hand, in FIG. 4, addresses[00] and [01] are in use, so that a value "1" is written into the addresses[00] and [01]. The rest of the addresses are not in use, and have an initial value "0". The controller 201 executes writing on the non-volatile memory 202 in an order from a smaller number address. When the power is turned on, the controller 201 writes a value "1" to an even number address of the non-volatile memory 202. When the information processing apparatus 100 is shut down under an abnormal condition such as power failure, the controller 201 writes a value "1" to an odd number address of the non-volatile memory 202. When the power control IC 104 controls the switching circuit 106 to turn on the power, the controller 201 sequentially checks the non-volatile memory 202 in an order from the address[00]. If the unused minimum-number address having a value "0" is an odd number address, it is found that the information processing apparatus 100 is terminated normally last time. Further, if the controller 201 sequentially checks the non-volatile memory 202 in an order from the address[00], and the unused minimum-number address having a value "0" is an even number address, it is found that the information processing apparatus 100 is terminated abnormally last time. In FIG. 3, because the unused minimum-number address is an odd number address[01], it is found that the information processing apparatus 100 is shut down normally last time. On the contrary, in FIG. 4, because the unused minimum-number address is an even number address[02], it is found that the information processing apparatus 100 is shut down under the abnormal condition such as the power failure last time. As is known by one skilled in the art, any values may be used to designate the states of "in use" and "not in use," as long as these values are different.

Figure 5:
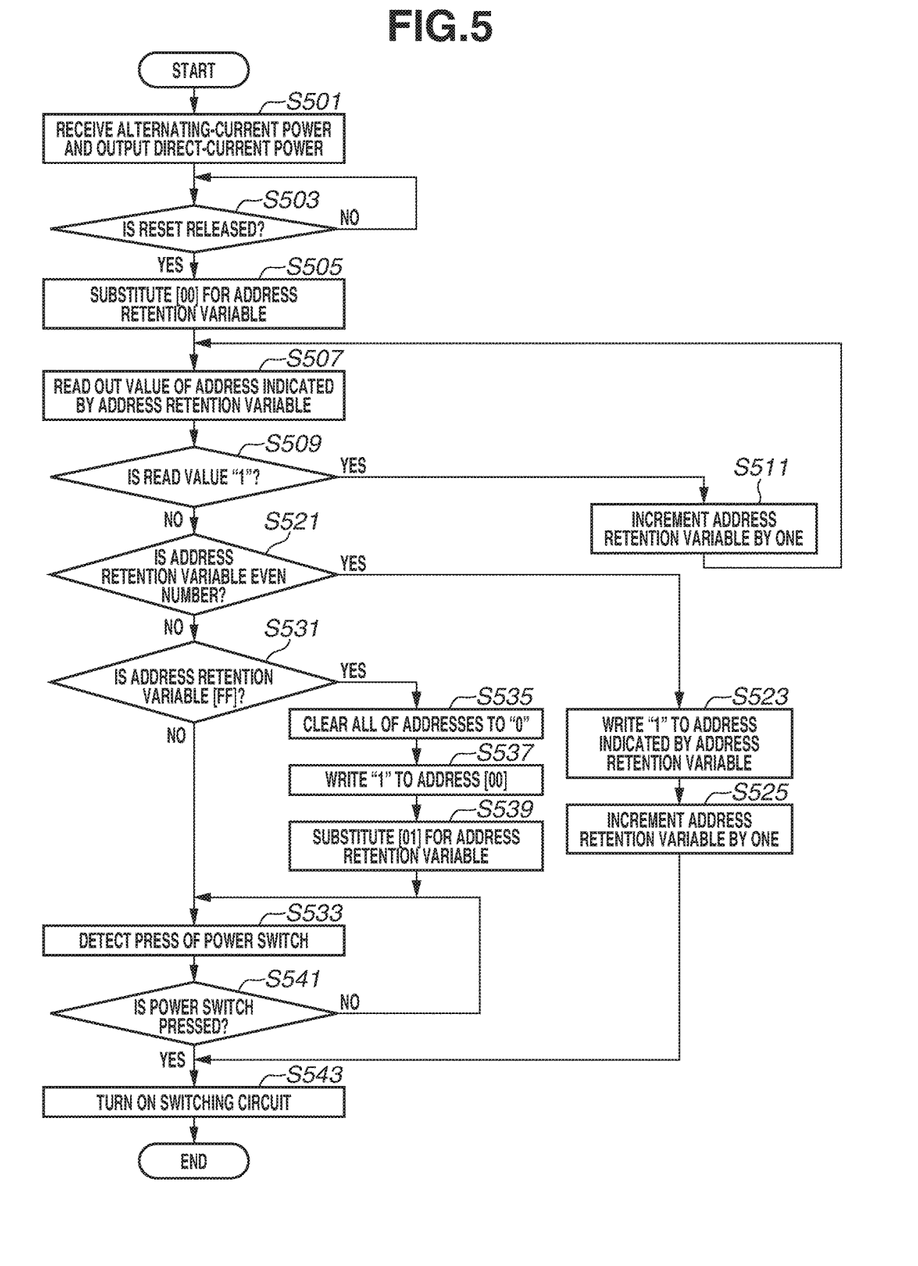
FIG. 5 is a flowchart illustrating processing to be executed at the time of power recovery according to a first exemplary embodiment.

FIG. 5 is a flowchart illustrating a control method of the information processing apparatus 100 when the commercial AC power is supplied thereto. Hereinafter, a control method of the information processing apparatus 100 to be executed when the information processing apparatus 100, which is not connected to the commercial AC power via the AC plug 101, is connected thereto via the AC plug 101, or when the power is recovered from the power failure will be described.

In step S501, the PSU 102 receives alternating-current power and supplies direct-current power to the power supply line 103. Then, the direct-current power is supplied to the power control IC 104. In step S503, the power control IC 104 receives the direct-current power from the power supply line 103 and waits until reset is released. When the reset is released (YES in step S503), the processing proceeds to step S505. In step S505, the controller 201 of the power control IC 104 substitutes an initial value[00] for an address retention variable in the SRAM 203 to initialize the address retention variable.

In step S507, the controller 201 of the power control IC 104 reads out an address value indicated by the address retention variable in the SRAM 203 from the non-volatile memory 202. At this point, because the address retention variable is the initial value[00], as illustrated in FIG. 3 or FIG. 4, the controller 201 reads out a value "1" of the address[00] in the non-volatile memory 202. In step S509, the controller 201 determines whether the read-out value is "1". In a case where the read-out value is "1" (YES in step S509), the processing proceeds to step S511. In a case where the read-out value is "0" (NO in step S509), the processing proceeds to step S521. At this time, because the read-out value is "1", the processing proceeds to step S511. In step S511, the controller 201 determines that the address indicated by the address retention variable is in use, and increments (increases) the address retention variable in the SRAM 203 by one in order to move onto the next address searching. Then, the processing returns to step S507. In step S507, the controller 201 reads out a value of the address[01] in the non-volatile memory 202. In step S509, the controller 201 advances the processing to step S521 with respect to the case illustrated in FIG. 3, and advances the processing to step S511 with respect to the case illustrated in FIG. 4. In a case where a value read out from the non-volatile memory 202 is "0", this indicates that the unused minimum-number address of the non-volatile memory 202 is found, so that the controller 202 ends the address searching. Then, the processing proceeds to step S521. With respect to the case illustrated in FIG. 3, the processing proceeds to step S521 when a value "0" of the address[01] is read out, and with respect to the case illustrated in FIG. 4, the processing proceeds to step S521 when a value "0" of the address[02] is read out.

In step S521, the controller 201 determines whether an address indicated by the address retention variable in the SRAM 203 is an even number. In a case where the address is an even number (YES in step S521), the processing proceeds to step S523, and in a case where the address is an odd number (NO in step S521), the processing proceeds to step S531. In a case where the address retention valuable (at this point, the unused minimum-number address) is an even number as illustrated in FIG. 4, this indicates that a value "1" is written into an odd number address at the last termination, so that it is found that the information processing apparatus 100 is terminated abnormally. In this case, the information processing apparatus 100 is activated without having a press event of the power switch 108, so that the processing proceeds to step S523.

In step S523, in preparation for occurrence of the next abnormal termination, the controller 201 writes "1" into an even number address indicated by the address retention variable in the non-volatile memory 202, so as to bring the address into a used state. In step S525, the controller 201 increments the address retention variable in the SRAM 203, so as to change the address indicated by the address retention variable to an odd number. Then, the processing proceeds to step S543. In step S543, the power control IC 104 turns on the switching circuit 106 and outputs a pressed-switch interruption signal to the CPU 107, so as to activate the information processing apparatus 100. In other words, the controller 201 of the power control IC 104 controls the switching circuit 106 to supply power voltage of the power supply line 103 to the CPU 107.

In step S521, in a case where the address retention variable (at this point, the unused minimum-number address) is an odd number as illustrated in FIG. 3, a value "1" is not written into the odd number address at the last termination, so that it is found that the information processing apparatus 100 is terminated normally. In this case, the information processing apparatus 100 is activated by a press event of the power switch 108, so that the processing proceeds to step S531.

In step S531, the controller 201 determines whether the address retention variable in the SRAM 203 is [FF]. In a case where the address retention variable is [FF] (YES in step S531), the processing proceeds to step S535, and in a case where the address retention variable is not [FF] (NO in step S531), the processing proceeds to step S533.

In step S535, because all of the addresses of the non-volatile memory 202 are used, the controller 201 clears and initializes the values of all of the addresses of the non-volatile memory 202 to "0". In other words, in a case where all of the addresses of the non-volatile memory 202 are written, the controller 201 clears the storage state of all of the addresses of the non-volatile memory 202. Then, in step S537, the controller 201 writes "1" to the address[00] of the non-volatile memory 202 to bring the address[00] into a used state. In step S539, the controller 201 substitutes[01] for the address retention variable in the SRAM 203, and the processing proceeds to step S533.

In step S533, the power control IC 104 detects whether the power switch 108 is pressed to turn on the power. In step S541, in a case where the controller 201 determines that the power switch 108 is pressed (YES in step S541), the processing proceeds to step S543. On the other hand, in a case where the controller 201 determines that the power switch 108 is not pressed (NO in step S541), the processing returns to step S533. In step S543, the power control IC 104 turns on the switching circuit 106 and outputs the pressed-switch interruption signal to the CPU 107, so as to activate the information processing apparatus 100.

As described above, the power switch 108 is a push switch for providing a power on/off instruction, and a press event of the power switch 108 does not occur at the time of the power recovery after the power supply stops because of the power failure. Even in the above-described situation, according to the present exemplary embodiment, in a case where the unused minimum-number address is an even number, it is determined that power is recovered from the power failure, and thus the information processing apparatus 100 can reactivate and operate after the power recovery.

Figure 6:
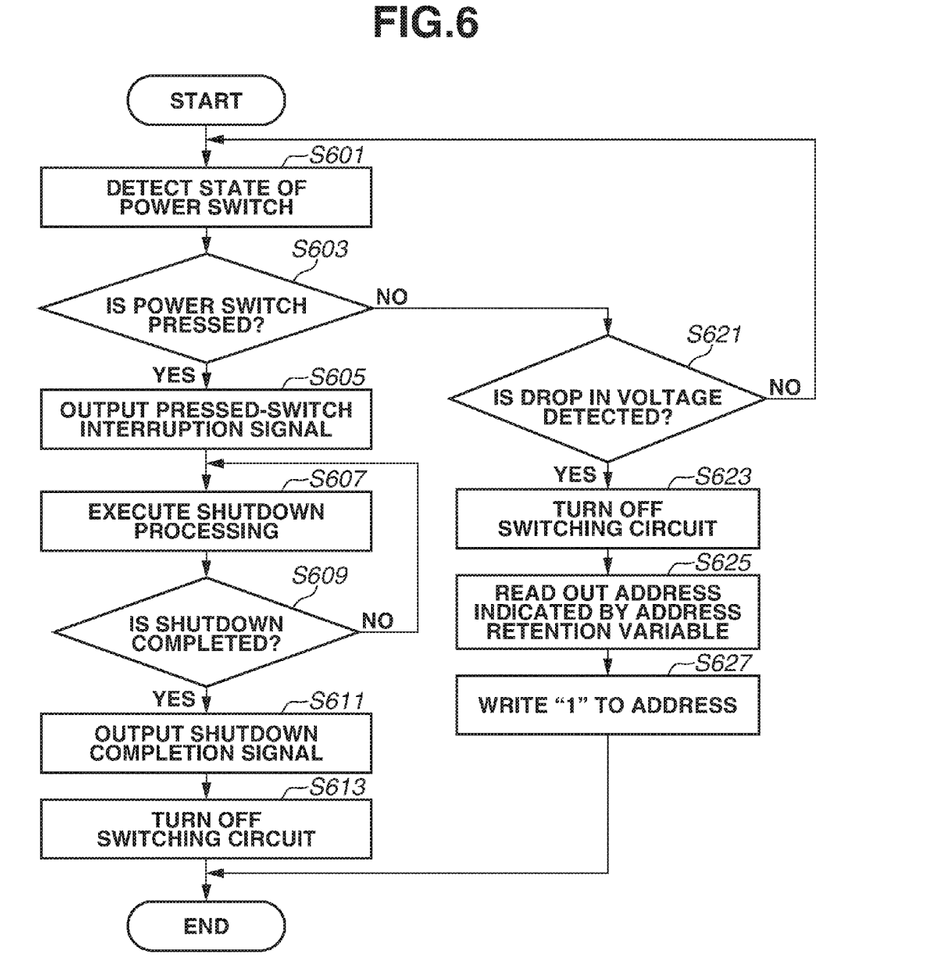
FIG. 6 is a flowchart illustrating processing to be executed at the time of power failure according to the first exemplary embodiment.

FIG. 6 is a flowchart illustrating a control method of the information processing apparatus 100 at the time of shutdown. Hereinafter, a control method of the information processing apparatus 100 at the time of the shutdown of the information processing apparatus 100 or at the time of occurrence of the power failure.

In step S601, the power control IC 104 detects a state of the power switch 108. In step S603, the power control IC 104 determines whether the power switch 108 is pressed to turn off the power. In a case where the power switch 108 is pressed (YES in step S603), the processing proceeds to step S605, and in a case where the power switch 108 is not pressed (NO in step S603), the processing proceeds to step S621.

In step S605, the power control IC 104 outputs a pressed-switch interruption signal of the power switch 108 to the CPU 107. In step S607, the CPU 107 executes shutdown processing. In step S609, the CPU 107 determines whether the shutdown processing is completed. In a case where the shutdown processing is not completed (NO in step S609), the processing returns to step S607, and in a case where the shutdown processing is completed (YES in step S609), the processing proceeds to step S611. In step S611, the CPU 107 outputs a shutdown completion signal to the power control IC 104. Then, in step S613, the power control IC 104 turns off the switching circuit 106 to complete the shutdown. In other words, the controller 201 of the power control IC 104 controls the switching circuit 106 not to supply power voltage of the power supply line 103 to the CPU 107. In this case, the information processing apparatus 100 is normally terminated by the power switch 108. Accordingly, as described above, a value "1" will not be written into the odd number address of the non-volatile memory 202, so that a state where the value "1" is written into the even number address of the non-volatile memory 202 is maintained.

In step S621, in a case where the power control IC 104 determines that the voltage monitoring IC 105 does not detect a drop in power voltage of the power supply line 103 (NO in step S621), the processing returns to step S601. On the other hand, in a case where the power control IC 104 determines that the voltage monitoring IC 105 detects a drop in power voltage of the power supply line 103 (YES in step S621), this indicates occurrence of the power failure, and thus the processing proceeds to step S623.

In step S623, the power control IC 104 turns off the switching circuit 106 and forcibly stops supplying direct-current power to the CPU 107 without waiting for completion of the shutdown of the CPU 107. In other words, the controller 201 of the power control IC 104 controls the switching circuit 106 not to supply power voltage of the power supply line 103 to the CPU 107. In step S625, the controller 201 of the power control IC 104 reads out the address indicated by the address retention variable in the SRAM 203. In step S627, the controller 201 writes a value "1" into the address indicated by the address retention variable in the non-volatile memory 202 and completes the shutdown. In this case, because the information processing apparatus 100 is terminated abnormally due to the power failure, a value "1" is written into the odd number address of the non-volatile memory 202 as described above.

According to the present exemplary embodiment, the information processing apparatus 100 sets an address indicated by the address retention variable in the SRAM 203 through address searching at the time of power-on as illustrated in FIG. 5. Then, the information processing apparatus 100 writes a value "1" into the set address indicated by the address retention variable in the non-volatile memory 202 when the power failure has occurred. As a result, it is possible to reduce time taken to search the non-volatile memory 202 for the address after the power failure has occurred, so that a value "1" can be written into the specified address within a short time.

The address searching of the non-volatile memory 202 is not limited to a method of reading out the address in an order from a smaller number address. A readout order may be changed according to the number of addresses or the use of the non-volatile memory 202, so that the information processing apparatus 100 can execute searching more quickly.

Figure 7:
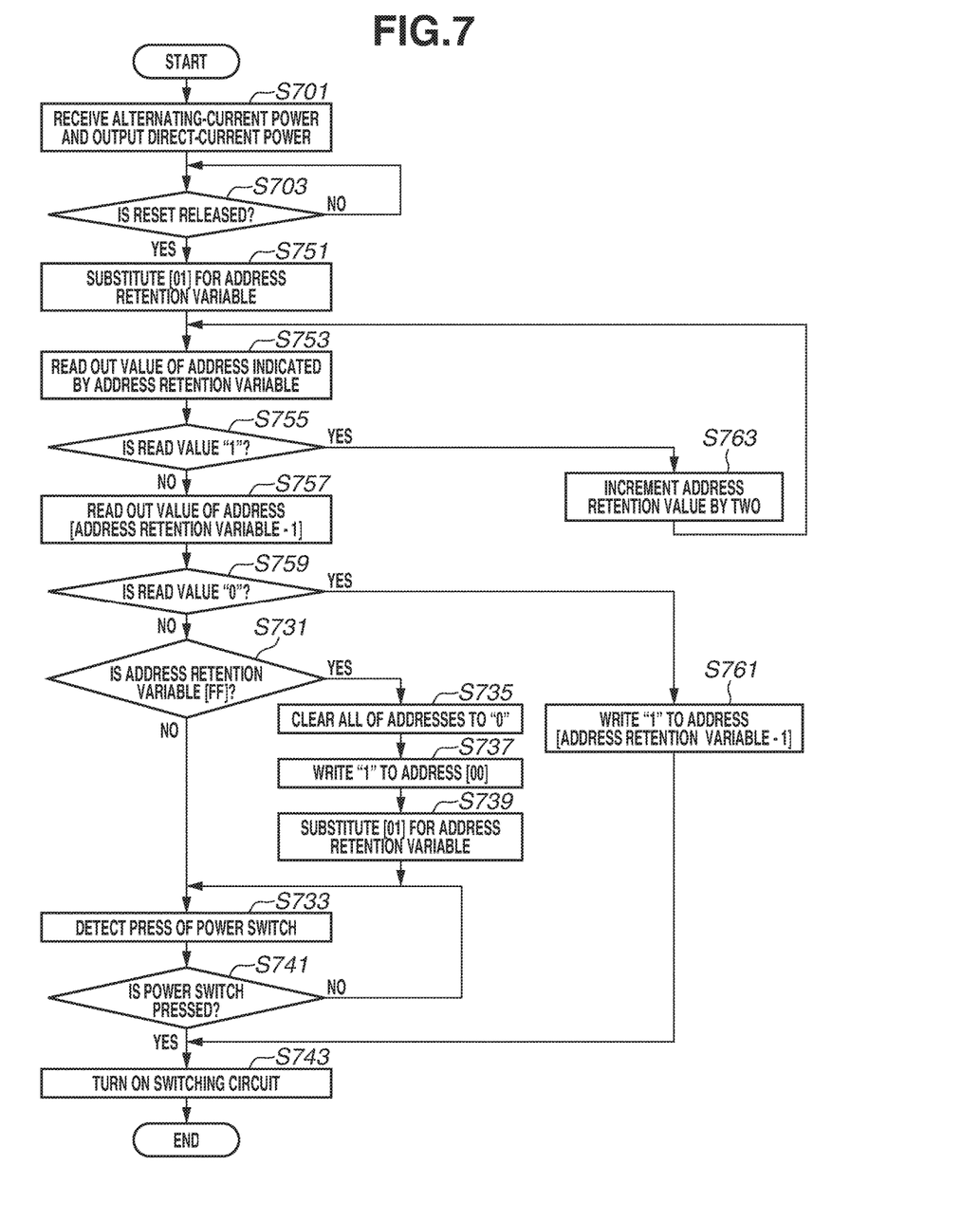
FIG. 7 is a flowchart illustrating processing to be executed at the time of power recovery according to a second exemplary embodiment.

FIG. 7 is a flowchart illustrating a control method of the information processing apparatus 100 of a second exemplary embodiment. A control method of the information processing apparatus 100 which is to be executed when the information processing apparatus 100 that is not connected to the commercial AC power via the AC plug 101 is connected thereto via the AC plug 101, or when the power is recovered from the power failure will be described. According to the present exemplary embodiment, time taken for the address searching can be reduced further than in the case of the first exemplary embodiment. Hereinafter, a configuration of the present exemplary embodiment different from that of the first exemplary embodiment will be described.

In steps S701 and S703, the information processing apparatus 100 executes processing similar to the processing executed in steps S501 and S503 in FIG. 5. In step S751, the controller 201 of the power control IC 104 substitutes an initial value[01] for the address retention variable in the SRAM 203. In step S753, the controller 201 of the power control IC 104 reads out a value of the address indicated by the address retention variable in the non-volatile memory 202. In step S755, in a case where the controller 201 determines that the read-out value is "1" (YES in step S755), the processing proceeds to step S763. In a case where the controller 201 determines that the read-out value is "0" (NO in step S755), the processing proceeds to step S757. In step S763, the controller 201 determines that the address indicated by the address retention variable is in use, and increments (increases) the address retention variable in the SRAM 203 by two in order to move onto the next address searching. Then, the processing returns to step S753.

In step S757, the controller 201 reads out a value of the address [address retention variable−1] from the non-volatile memory 202. In step S759, in a case where the controller 201 determines that the read-out value is "0" (YES in step S759), the processing proceeds to step S761. In a case where the controller 201 determines that the read-out value is "1" (NO in step S759), the processing proceeds to step S731. In step S761, the controller 201 writes a value "1" into the address [address retention variable−1] in the non-volatile memory 202, and the processing proceeds to step S743. In steps S731 to S741, the information processing apparatus 100 executes processing similar to the processing in steps S531 to S541, and the processing proceeds to step S743. In step S743, the power control IC 104 turns on the switching circuit 106.

In the present exemplary embodiment, the initial value [01] is substituted for the address retention variable in step S751, and the address retention variable is incremented by two in step S763, so that the address indicated by the address retention variable is always an odd number address. Accordingly, an address of the non-volatile memory 202 that is to be written at the time of the power failure in FIG. 6 is the odd number address. In FIG. 7, as address searching of the non-volatile memory 202 is executed with respect to only the odd number addresses, time necessary for the address searching is shortened, and the activation time can be reduced.

The above-described first and the second exemplary embodiments are merely examples. Various modifications are possible with respect to the combinations of the constituent elements and the values described in the first and the second exemplary embodiments, and various existing searching algorithms can be used for the address searching method. Thus, a general constituent element which is not exemplified in the information processing apparatus 100 may be added thereto.

The controller 201 serves as a determination unit to determine an address through a predetermined method before power is turned off or voltage is dropped after activation including power-on. Further, the controller 201 executes power-off processing in a case where an operation instruction of the power switch 108 is provided after the power-on processing. Then, in a case where a drop of voltage of the PSU 102 is detected after the power-on processing, the controller 201 writes information to be saved into the address of the non-volatile memory 202 previously determined by the controller 201.

The controller 201 executes processing in FIG. 5 or FIG. 7 when power supply starts or power is recovered after the power failure. At this time, in a case where an address next to a last address of a region where writing is executed on the non-volatile memory 202 is an even number, the controller 201 executes writing with respect to the address next to the last address in step S523 or S761. Then, the controller 201 sets an address next to the address to which writing is executed as an address retention variable (i.e., writing address). The controller 201 executes the power-on processing in step S543 or S743 without waiting for an operation instruction of the power switch 108 in step S541 or S741.

Further, in FIG. 5 or FIG. 7, in a case where the address next to the last address is an odd number, the controller 201 sets an address next to the last address as an address retention variable (i.e., writing address). Then, the controller 201 executes the power-on processing in step S543 or S743 when an operation instruction of the power switch 108 is provided in step S541 or S741.

Furthermore, in FIG. 6, in a case where an operation instruction of the power switch 108 is provided in step S603 after the power-on processing in FIG. 5 or FIG. 7, the controller 201 executes the power-off processing in step S613. In a case where a drop in power voltage is detected in step S621 after the power-on processing in FIG. 5 or FIG. 7, the controller 201 executes the power-off processing in step S623 and executes writing with respect to the writing address of the non-volatile memory 202 in step S627 as well.

In FIG. 5, the controller 201 sequentially searches for the address to which writing is executed on the non-volatile memory 202 when power supply starts or power is recovered after the power failure. Then, in step S511, the controller 201 sets the address next to the last address to which writing is executed on the non-volatile memory 202 as the address retention variable (i.e., writing address). The controller 201 executes writing with respect to the address retention variable (writing address) in step S523 in a case where the address retention variable (writing address) is an even number, and updates the address retention variable (writing address) in step S525. Then, the controller 201 executes the power-on processing in step S543 without waiting for an operation instruction of the power switch 108 in step S541. On the other hand, in a case where the address retention variable (writing address) is an odd number, the controller 201 executes the power-on processing in step S543 when an operation instruction of the power switch 108 is provided in step S541.

In FIG. 7, the controller 201 sequentially searches for the odd number address to which writing is executed on the non-volatile memory 202 when power supply starts or power is recovered after the power failure. Then, in step S763, the controller 201 sets the odd number address next to the last odd number address to which writing is executed on the non-volatile memory 202 as the address retention variable (i.e., writing address). In a case where writing is not executed with respect to an address between the last odd number address and the odd number address next to the last odd number address, in step S761, the controller 201 executes writing with respect to the address between the last odd number address and the odd number address next the last odd number address. Then, the controller 201 executes the power-on processing in step S743 without waiting for an operation instruction of the power switch 108 in step S741. On the other hand, in a case where writing is executed with respect to the address between the last odd number address and the odd number address next to the last odd number address, the controller 201 executes the power-on processing in step S743 when an operation instruction of the power switch 108 is provided in step S741.

The odd number and the even number may be reversed in the processing in FIGS. 5 to 7. Further, a state where writing is executed on the non-volatile memory 202 corresponds to a state where a value "1" is stored in the non-volatile memory 202. On the contrary, a state where writing is not executed on the non-volatile memory 202 corresponds to a state where a value "0" is stored in the non-volatile memory 202. In addition, values "1" and "0" for indicating the storage states may be reversed.

Further, in the processing in FIGS. 5 to 7, although the controller 201 executes writing on the non-volatile memory 202 in an order from a smaller number address, the writing may be executed in an order from a larger number address.

According to the first and the second exemplary embodiments, because the controller 201 executes writing in an order from a smaller number address or a larger number address instead of executing writing with respect to the same address of the non-volatile memory 202, the lifetime of the non-volatile memory 202 can be extended.

As it will take a long time if the address retention variable (writing address) is set by the address searching after detecting the power failure, there is a risk in which writing processing with respect to the writing address of the non-volatile memory 202 cannot be completed. According to the first and the second exemplary embodiments, because the controller 201 sets the writing address through address searching when power supply starts or power is recovered after the power failure instead of setting the writing address at the time of the power failure, writing with respect to the writing address of the non-volatile memory 202 can be executed within a short time. With this configuration, occurrence of the power failure can be reliably written into the non-volatile memory 202.

As described above, when a power failure information flag is written into a non-volatile memory in an address unit in order to extend a lifetime thereof, it is necessary to clearly specify the address to which the flag is written. According to an aspect of the present exemplary embodiment, a number of writing times will not be increased with respect to a block where a subsequent writing address is retained. Therefore, a writing lifetime of the non-volatile memory can be extended. Further, it is not necessary to scan the non-volatile memory using electric charges remaining in a circuit after occurrence of the power failure. Therefore, it is possible to eliminate a risk in which writing cannot be completed because of a shortage of remaining electric charge. Furthermore, according to another aspect of the present exemplary embodiment, a writing address can be set so as to reliably execute writing when the power failure has occurred.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-185905, filed Sep. 23, 2016, which is hereby incorporated by reference herein in its entirety.

What is claimed is:

1. An image forming apparatus comprising:
   a non-volatile storage unit including a plurality of memory regions corresponding respectively to a plurality of addresses;
   a power circuit configured to supply power;
   a voltage detection integrated circuit (IC) configured to detect whether power voltage based on the power is decreased to a value less than a threshold value; and
   a controller including a memory storing instructions and a processor which executes the instructions, the controller being configured to
   determine an address corresponding to a memory region where, among the plurality of memory regions, predetermined data is to be stored, based on activation of the image forming apparatus,
   cause the predetermined data to be stored in the memory region corresponding to the determined address based on a decrease in the power voltage, and
   activate the image forming apparatus based on that data is stored in the memory region corresponding to the determined address and no data is stored in a memory region corresponding to an address succeeding the determined address after the image forming apparatus shuts down based on the decrease in the power voltage and after power is supplied to the image forming apparatus that has shut down.

2. The image forming apparatus according to claim 1, wherein the memory region corresponding to the determined address stores initial value data, and
wherein the controller overwrites the initial value data that represents "0" with the predetermined data that represents "1".

3. The image forming apparatus according to claim 1, wherein the controller clears a storage state of all of addresses of the plurality of memory regions of the non-volatile storage unit in a case where the predetermined data is stored in all of the plurality of memory regions of the non-volatile storage unit.

4. The image forming apparatus according to claim 1, further comprising:
a switching circuit configured to supply power to a processor,
wherein the controller executes the power-on processing by controlling the switching circuit to supply the power to the processor and executes the power-off processing by controlling the switching circuit not to supply the power to the processor.

5. The image forming apparatus according to claim 1, wherein the controller determines the address corresponding to the memory region where, among the plurality of memory regions, the predetermined data is to be stored, according to supply of the power to the image forming apparatus.

6. The image forming apparatus according to claim 5, wherein the controller confirms data stored in the plurality of memory regions of the non-volatile storage unit in order of arrangement of addresses, and wherein the controller determines an address corresponding to a memory region where, among the plurality of memory regions, the predetermined data is not stored, wherein the address corresponding to the memory region is an address to be confirmed next to the address corresponding to the memory region where the predetermined data is stored, among the plurality of addresses of the non-volatile storage unit.

7. The image forming apparatus according to claim 6, wherein the controller confirms the data in order from a smaller number address of the non-volatile storage unit.

8. The image forming apparatus according to claim 1, wherein the power supplied to the image forming apparatus is decreased due to a power failure.

9. The image forming apparatus according to claim 1, wherein, in a case where the predetermined data is stored in a memory region which, among the plurality of memory regions, corresponds a first address among the plurality of addresses of the non-volatile storage unit, the determined address is a second address corresponding to a memory region where, among the plurality of memory regions, the predetermined data is not stored, wherein the second address is an address that is subsequent to the first address.

10. The image forming apparatus according to claim 9, further comprising:
a power switch configured to instruct activation or shutdown of the image forming apparatus,
wherein the controller obtains the second address corresponding to a memory region in which, among the plurality of memory regions, the predetermined data is not stored, among the plurality of addresses of the non-volatile storage unit, after the power is supplied to the image forming apparatus by recovering from the power failure and before the power supplied to the image forming apparatus decreases, and
wherein the controller determines whether the second address is a predetermined address, and activates the image forming apparatus based on determination that the second address is not the predetermined address and selection of the power switch.

11. The image forming apparatus according to claim 10, wherein the predetermined address is an even number address.

12. The image forming apparatus according to claim 10, wherein the predetermined address is an odd number address.

13. The image forming apparatus according to claim 10, wherein the power switch is a push-switch type power on-off button.

14. The image forming apparatus according to claim 1,
wherein the controller checks whether data is stored in the memory region corresponding to the determined address or not after the image forming apparatus shuts down based on the decrease in the power voltage and after power is supplied to the image forming apparatus that has shut down,
wherein the controller checks whether data is stored in the memory region corresponding to the succeeding address based on that data is stored in the memory region corresponding to the determined address, and
wherein, based on that no data is stored in the memory region corresponding to the succeeding address,
the controller stores predetermined data into the memory region corresponding to the succeeding address before activating the image forming apparatus.

15. The image forming apparatus according to claim 14, wherein the predetermined address is an even number address.

16. The image forming apparatus according to claim 15, wherein the controller searches for even number addresses sequentially among the plurality of addresses of the non-volatile storage unit, and
wherein the controller obtains an even number address corresponding to a memory region in which, among the plurality of memory regions, the predetermined data is not stored, wherein the even number address in which the predetermined data is not stored is an address to be confirmed next to an even number address corresponding to a memory region in which, among the plurality of memory regions, the predetermined data is stored, among the plurality of addresses of the non-volatile storage unit.

17. The image forming apparatus according to claim 14, wherein the predetermined address is an odd number address.

18. The image forming apparatus according to claim 17,
wherein the controller searches for odd number addresses sequentially among the plurality of addresses of the non-volatile storage unit, and
wherein the controller obtains an odd number address corresponding to a memory region in which, among the plurality of memory regions, the predetermined data is not stored wherein the odd number address in which the predetermined data is not stored is an address to be confirmed next to an odd number address corresponding to a memory region in which, among the plurality of memory regions, the predetermined data is stored, among the plurality of addresses of the non-volatile storage unit.

19. The image forming apparatus according to claim 1, wherein in a case where the power detection IC does not detect that the power voltage is not decreased to the value less than the threshold value, the predetermined data is not stored in the memory region which, among the plurality of memory regions, corresponds the determined address.

20. The image forming apparatus according to claim 1, wherein the shutdown of the image forming apparatus shuts based on the decrease in the power voltage is a shutdown executed forcibly.

21. A control method of an image forming apparatus including a non-volatile storage unit including a plurality of memory regions corresponding respectively to a plurality of addresses, and a power circuit configured to supply power, the control method comprising:
- detecting whether power voltage based on the power is decreased to a value less than a threshold value;
- determine an address corresponding to a memory region where, among the plurality of memory regions, predetermined data is to be stored, based on activation of the image forming apparatus,
- causing the predetermined data to be stored in the memory region corresponding to the determined address based on a decrease in the power voltage, and
- activating the image forming apparatus based on that data is stored in the memory region corresponding to the determined address and no data is stored in a memory region corresponding to an address succeeding the determined address after the image forming apparatus shuts down based on the decrease in the power voltage and after power is supplied to the image forming apparatus that has shut down.

* * * * *